United States Patent [19]

Smith

[11] Patent Number: 5,279,662
[45] Date of Patent: Jan. 18, 1994

[54] ALKYL POLYGLYCOSIDE AS A DISPERSANT FOR TITANIUM DIOXIDE

[75] Inventor: George A. Smith, Newtown, Pa.

[73] Assignee: Henkel Corporation, Plymouth Meeting, Pa.

[21] Appl. No.: 21,700

[22] Filed: Feb. 24, 1993

[51] Int. Cl.$^5$ .............................................. C09C 1/36
[52] U.S. Cl. ..................................... 106/447; 106/436
[58] Field of Search ............................ 106/436, 447

[56] References Cited

U.S. PATENT DOCUMENTS

| | | | |
|---|---|---|---|
| 3,432,323 | 3/1969 | Wigginton | 106/447 |
| 3,592,940 | 7/1971 | Quesada | 106/447 |
| 3,663,284 | 5/1972 | Stancioff et al. | 106/447 |
| 4,280,849 | 7/1981 | Howard et al. | 106/436 |
| 4,288,254 | 9/1981 | Gladu | 106/436 |

OTHER PUBLICATIONS

Chiming Ma and Yin Xia, "Mixed Adsorption Of Sodium Dodecylsulfate And Ethoxylated Nonylphenol On TiO$_2$ And The Stability Of TiO$_2$ Dispersions In Sodium Dodecylsulfate-Ethoxylated Nonylphenol Mixed Solutions", *Colloids and Surfaces*, vol. 68 (1992), pp. 171–177.

Shoji Fukushima and Shigenori Kumagai, "The Adsorption Of Nonionic Ethoxylated Surfactants On Titanium Dioxide And Their Dispersion Effect In Water", *Journal of Colloid And Interface Science*, vol. 42, No. 3, Mar., 1973, pp. 539–544.

Shigenori Kumagai and Shoji Fukushima, "Adsorption Of Nonionic Ethoxylated Surfactants On Titanium Dioxides And Their Dispersion Effect in Water", *Journal Of Colloid And Interface Science*, vol. 56, No. 2, Aug., 1976, pp. 227–232.

*Primary Examiner*—Mark L. Bell
*Assistant Examiner*—Willie J. Thompson
*Attorney, Agent, or Firm*—Ernest G. Szoke; Wayne C. Jaeschke; John E. Drach

[57] ABSTRACT

Alkyl polyglycoside surfactants are effective dispersing agents for TiO$_2$ in aqueous dispersions.

11 Claims, 5 Drawing Sheets

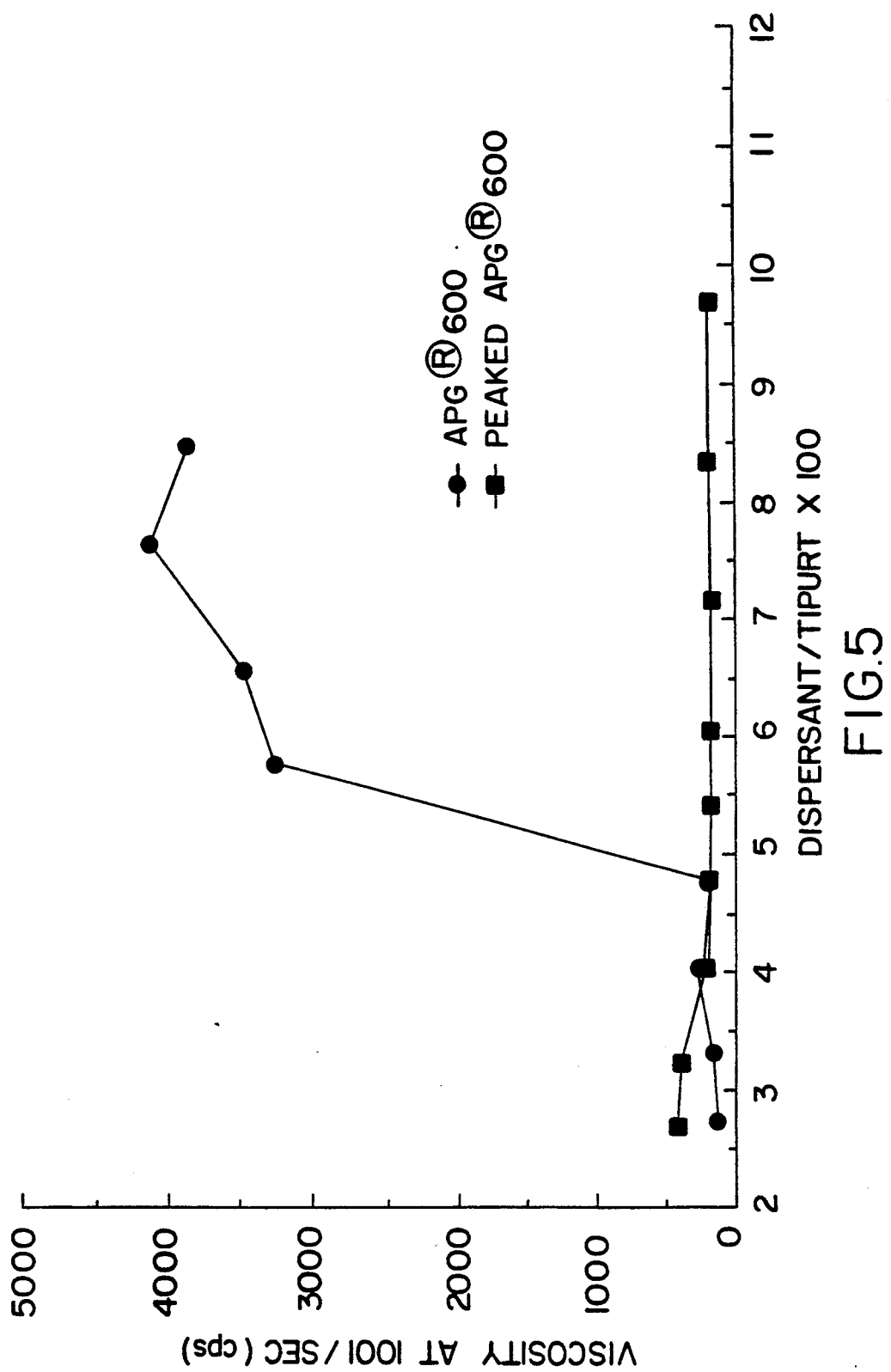

ALKYL POLYGLYCOSIDE AS A DISPERSANT FOR TITANIUM DIOXIDE

BACKGROUND OF THE INVENTION

1. Field of the Invention

This invention relates to aqueous titanium dioxide dispersions containing alkyl polyglycosides as the dispersant.

2. Description of the Related Art

Titanium dioxide is commonly used as a pigment in oil-based and water-based paints. Titanium dioxide is incorporated as an aqueous dispersion into water-based latex paints which normally contain at least titanium dioxide, water, and a polymer latex which is a dispersion of polymer particles. However, a number of problems have been associated with the use of aqueous $TiO_2$ slurries. For example, slurries which contain large amounts of $TiO_2$ and no dispersant exhibit unacceptably high viscosities. In the formulation of water-based paints containing $TiO_2$ it has been observed that individual $TiO_2$ particles tend to agglomerate and form clumps which settle and are difficult to redisperse. As a result, water-based paints containing $TiO_2$ pigments exhibit a storage stability problem in that the pigment particles tend to settle out over time. To overcome these problems, dispersing agents are normally added to the paint formulations. The most common dispersing agents are low molecular weight polyacrylic acids. Polyacrylic acids suffer from the disadvantages that they always contain some residual acrylic acid monomer which presents a health and safety hazard to the manufacturers and end users of the water-based paints. Another drawback associated with the use of polyacrylic acids as dispersants is that these compounds are most effective in the neutralized salt form. This limits their applications to alkaline pH systems and can create moisture sensitivity problems in the finished coating.

SUMMARY OF THE INVENTION

The surprising discovery has been made that alkyl polyglycoside surfactants are effective dispersing agents for aqueous $TiO_2$ dispersion. It has also been discovered that the control of the $TiO_2$ slurry viscosity, viscoelastic properties, effective particle size, and sedimentation rate of the individual $TiO_2$ particles is a function of the molecular structure of the alkyl polyglycoside surfactant. The use of alkyl polyglycoside surfactants as dispersants for aqueous $TiO_2$ dispersion overcomes the difficulties associated with the use of polyacrylic acid dispersants as set forth above in that they are nonionic and thus do not have to be used in alkaline media. In addition, alkyl polyglycoside surfactants present a minimal health and safety problems in that they are orally non-toxic and very mild to the skin and eyes.

BRIEF DESCRIPTION OF THE DRAWINGS

FIG. 5 is dispersion demand curve for a peaked and non-peaked APG ® 600 in an aqueous dispersion of one type of $TiO_2$, TI-PURE ® R-960.

DESCRIPTION OF THE REFERRED EMBODIMENTS

Figure 1:
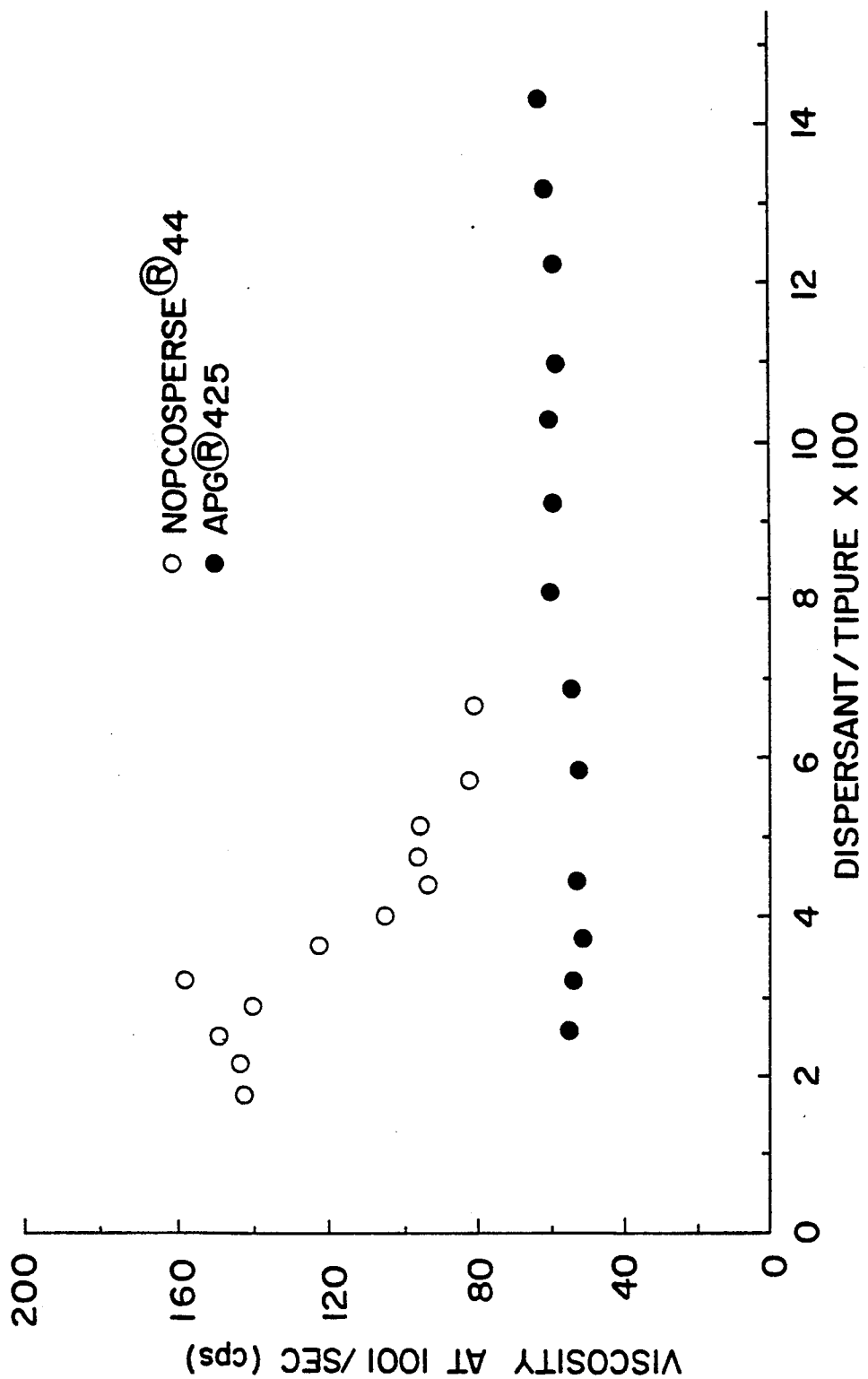
FIG. 1 is dispersion demand curve for APG ® 425 and Nopcosperse ® 44 in an aqueous dispersion TI-PURE ® R-900.

Other than in the operating examples, or where otherwise indicated, all numbers expressing quantities of ingredients or reaction conditions used herein are to be understood as modified in all instances by the term "about".

The compositions according to the invention are comprised of titanium dioxide, water and one or more compounds of the formula I $$R_4O(R_5O)_a(Z)_b \qquad \text{I}$$

wherein $R_4$ is a monovalent organic radical having from about 6 to about 30 carbon atoms; $R_5$ is divalent alkylene radical having from 2 to 4 carbon atoms; Z is saccharide residue having 5 or 6 carbon atoms; a is a number having a value from 0 to about 12; b is a number having a value from 1 to about 6.

The alkyl polyglycosides which can be used as dispersants for aqueous $TiO_2$ dispersions according to the invention have the formula I and are commercially available as, for example, APG ®, Glucopon ™, or Plantaren ™ surfactants from Henkel Corporation, Ambler, Pa., 19002. Examples of such surfactants include but are not limited to:

1. APG ® 225—an alkylpolyglycoside in which the alkyl group contains 8 to 10 carbon atoms.
2. APG ® 425—an alkyl polyglycoside in which the alkyl group contains 8 to 16 carbon atoms.
3. APG ® 625—an alkyl polyglycoside in which the alkyl groups contains 12 to 16 carbon atoms.
4. APG ® 300—an alkyl polyglycoside substantially the same as the 325 product above but having a different average degree of polymerization.
5. Glucopon ™ 600—an alkylpolyglycoside substantially the same as the 625 product above but having a different average degree of polymerization.
6. Plantaren ™ 2000—a $C_{8-16}$ alkyl polyglycoside.
7. Plantaren ™ 1300—a $C_{12-16}$ alkyl polyglycoside.
8. Plantaren ™ 1200—a $C_{12-16}$ alkyl polyglycoside.

Other examples include alkyl polyglycoside surfactant compositions which are comprised of mixtures of compounds of formula I wherein Z represents a moiety derived from a reducing saccharide containing 5 or 6 carbon atoms; a is zero; b is a number from 1.8 to 3; and $R^4$ is an alkyl radical having from 8 to 20 carbon atoms. The composition is characterized in that it has increased surfactant properties and an HLB in the range of about 10 to about 16 and a non-Flory distribution of glycosides, which is comprised of a mixture of an alkyl monoglycoside and a mixture of alkyl polyglycosides having varying degrees of polymerization of 2 and higher in progressively decreasing amounts, in which the amount by weight of polyglycoside having a degree of polymerization of 2, or mixtures thereof with the polyglycoside having a degree of polymerization of 3, predominate in relation to the amount of monoglycoside, said composition having an average degree of polymerization of about 1.8 to about 3. Such compositions, also known as peaked alkyl polyglycosides, can be prepared by separation of the monoglycoside from the original reaction mixture of alkyl monoglycoside and alkyl polyglycosides after removal of the alcohol. This separation may be carried out by molecular distillation and normally results in the removal of about 70-95% by weight of the alkyl monoglycosides. After removal of the alkyl monoglycosides, the relative distribution of the various components, mono- and polyglycosides, in the resulting product changes and the concentration in the product of the polyglycosides relative to the monoglycoside increases as well as the concentration of individual polyglycosides to the total, i.e. DP2 and DP3 fractions in relation to the sum of all DP fractions. Such compositions are disclosed in copending application Ser. No. 07/810,588, filed on Dec. 12, 1991, the entire contents of which are incorporated herein by reference.

The $TiO_2$ which can be dispersed by an alkyl polyglycoside is any type of $TiO_2$, particularly $TiO_2$ which has undergone an isomorphous surface treatment. Such $TiO_2$ types include any type of pigment grade used for pigmentation of paints, particularly water-based latex paints, such as TI-PURE ® R-900, TI-PURE ® R-960 and TI-PURE ® R-931, trademark products of DuPont Chemicals, Wilmington, Del. and Unitane ® Anatase grade and Rutile grade $TiO_2$, trademark products of Kemira, Inc., Savannah, Ga. 31402.

An aqueous $TiO_2$ dispersion comprising an alkyl polyglycoside surfactant as the dispersant can be made by adding the $TiO_2$ and alkyl polyglycoside to water and mixing with a high speed dispersing-type mixer such as a Cowles mixer, ball mill, or any other dispersing-type mixer known to those of ordinary skill in the art. The amount of alkyl polyglycoside necessary to effectively disperse a $TiO_2$ dispersion in water or in a water-based paint formulation will vary according to the type of $TiO_2$ and will typically range from 0.2% to 20% by weight.

A preferred composition according to the invention is one which is comprised of 75% by weight of $TiO_2$ and 25% by weight of a mixture comprised of water and a compound of the formula I.

Figure 2:
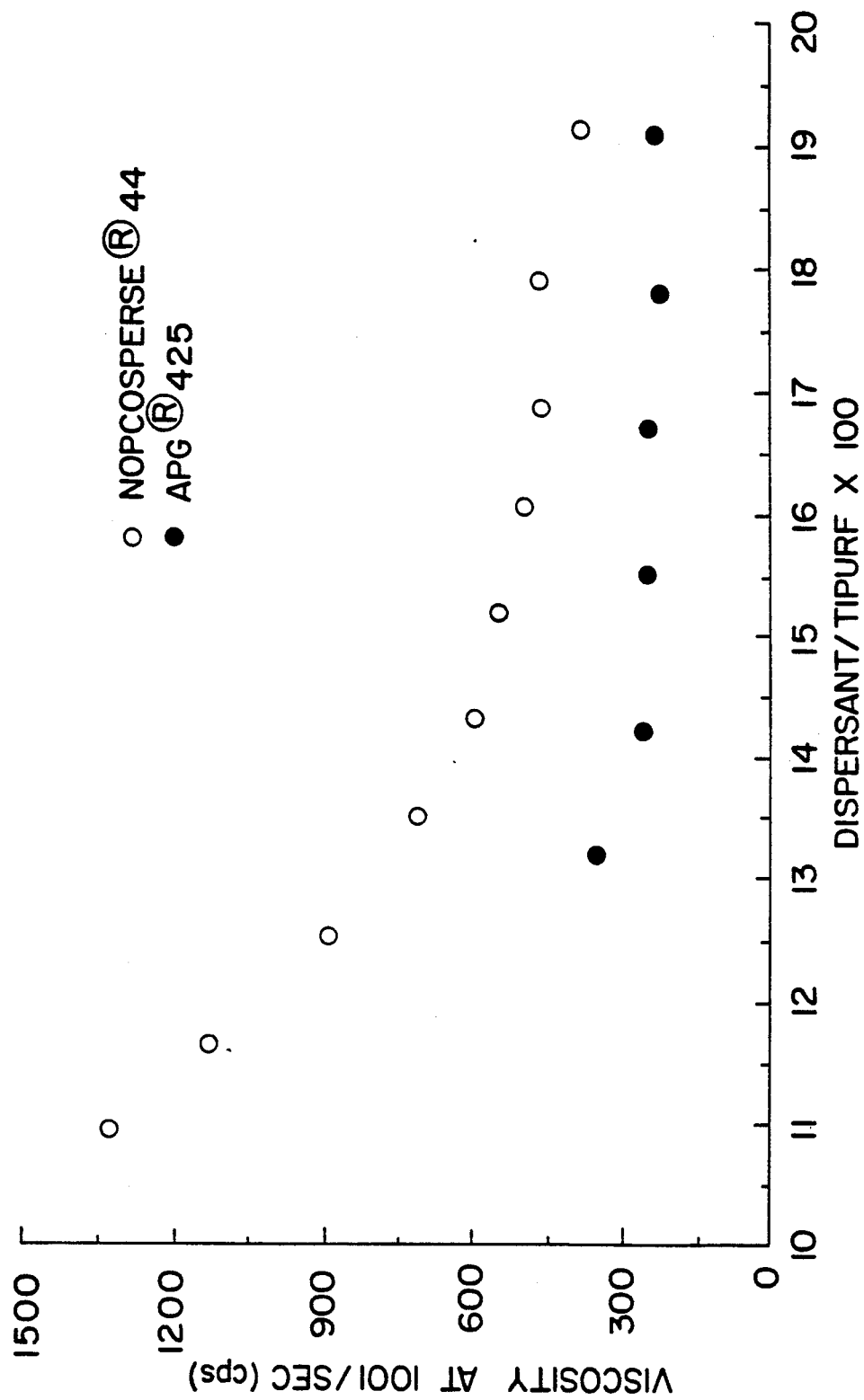
FIG. 2 is dispersion demand curve for APG ® 425 and Nopcosperse ® 44 in an aqueous dispersion TI-PURE ® R-931.
Figure 3:
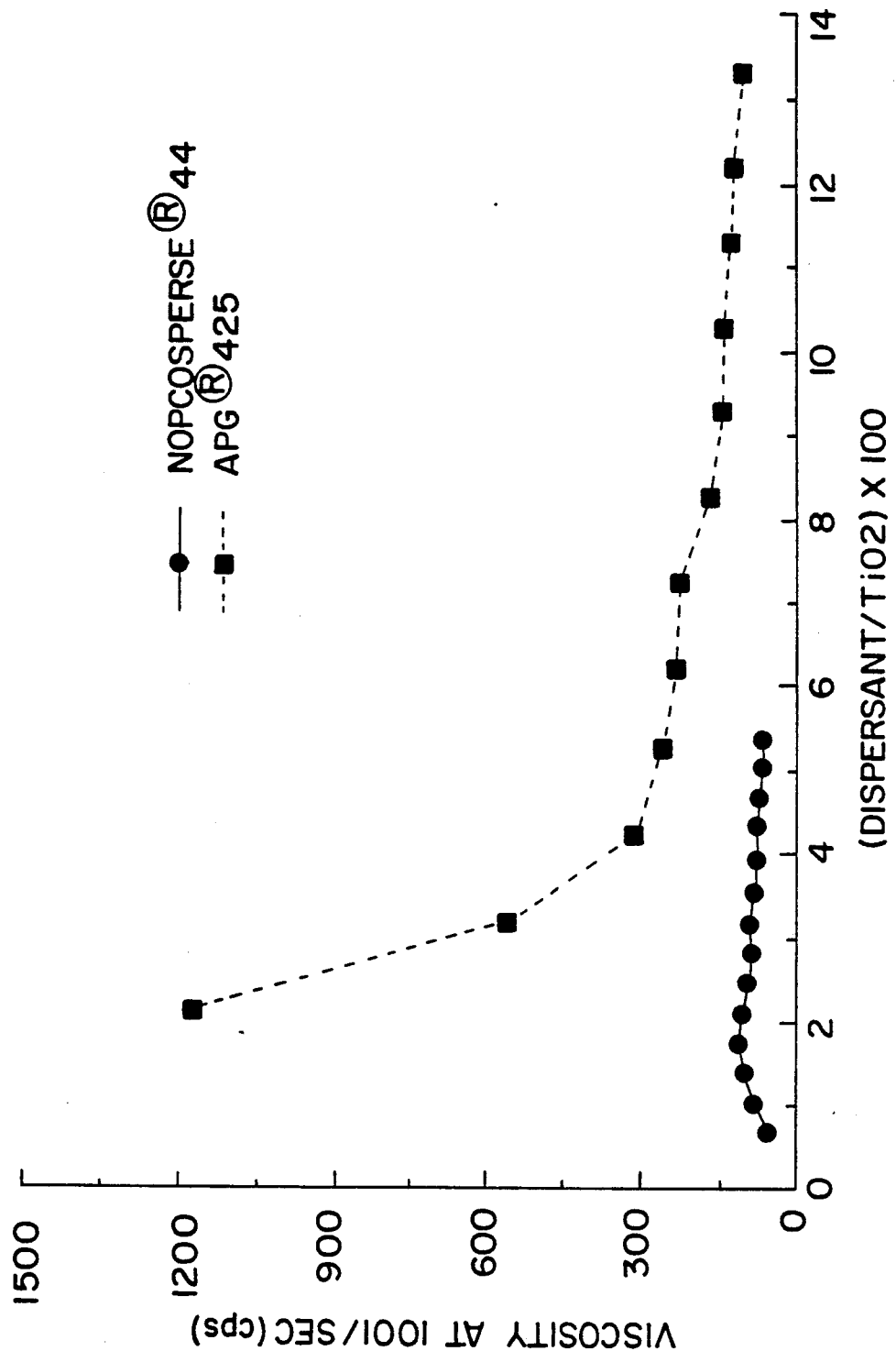
FIG. 3 is dispersion demand curve for APG ® 425 and Nopcosperse ® 44 in an aqueous dispersion TI-PURE ® R-960.
Figure 4:
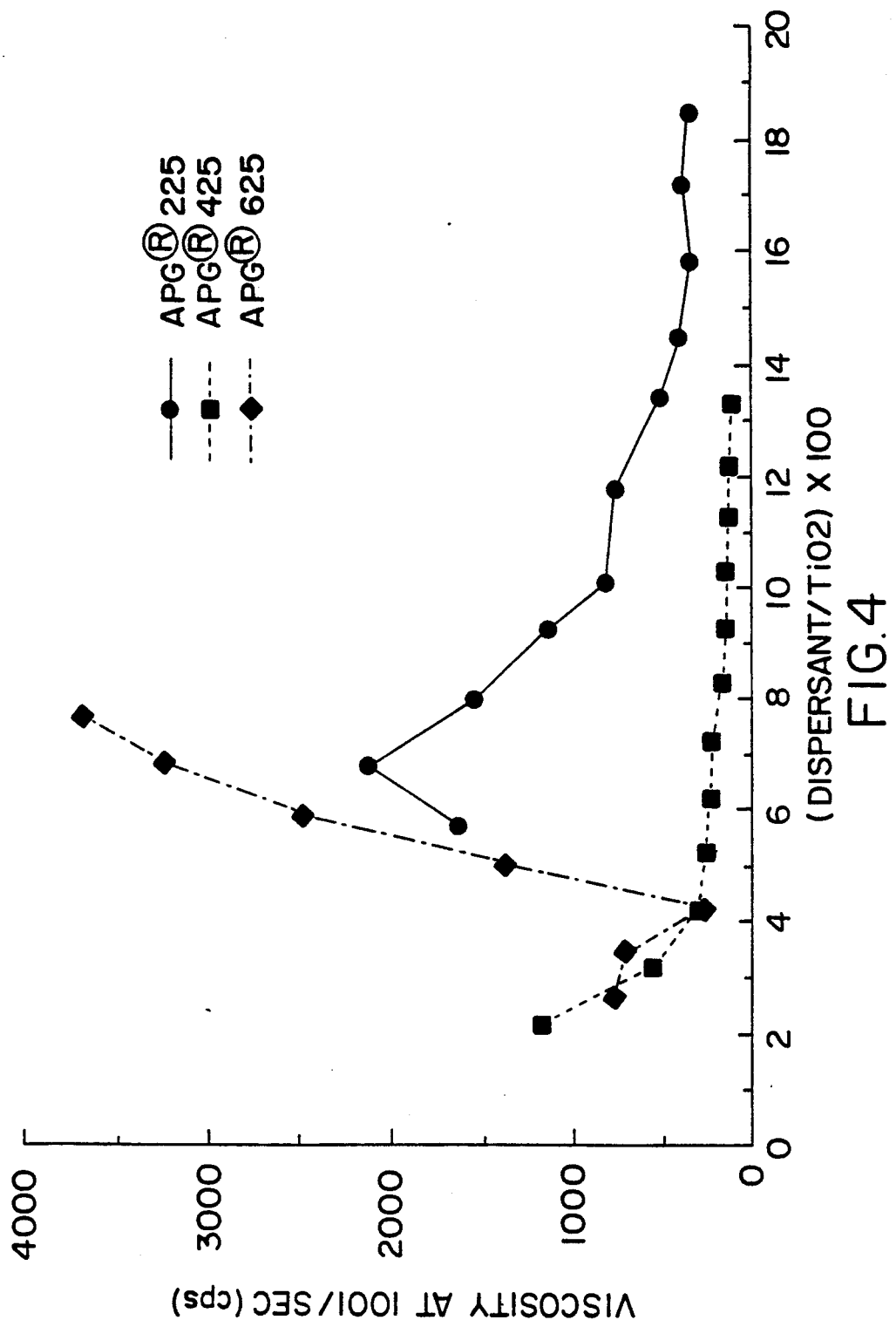
FIG. 4 is dispersion demand curve for APG ® 225, 425, and 625 in an aqueous dispersion of one type of $TiO_2$, TI-PURE ® R-960.

The ability of a substance to disperse $TiO_2$ in an aqueous medium is best evaluated by examining a dispersion demand curve, such as those depicted in FIGS. 1-5, wherein the viscosity of an $TiO_2$ dispersion at a constant shear rate is plotted as a function of the amount of dispersant expressed as a percentage of the amount of on the $TiO_2$. FIGS. 1-5 show the effect of the addition of an alkyl polyglycoside surfactant and Nopcosperse ® 44, a trademark product of Henkel Corporation, Ambler, Pa., 19002, which is a polyacrylic acid having a molecular weight of 7,000-9,000, on the viscosity of an $TiO_2$ dispersion at a constant shear rate of 1000 $sec^{-1}$. FIG. 1 shows the effect of the addition of APG ® 425 and Nopcosperse ® 44 on an aqueous dispersion TI-PURE ® R-900 comprised of 75% by weight TI-PURE ® R-900 based on the total dispersion weight. The curve for Nopcosperse ® 44 depicts the behavior of a typical commercial dispersant in that the viscosity decreases with increasing $TiO_2$ percentage and then remains essentially constant. The curve for APG ® 425 is representative of an ideal case wherein the slurry viscosity is not a function of the amount of dispersant. That the amount of APG ® 425 has essentially no effect on the dispersion viscosity is evidenced by a straight line having a slope of zero which can be drawn through the points for APG ® 425. FIGS. 2, 3 and 4 show that the effect of APG ® 425 on different types of $TiO_2$ is essentially the same as depicted in FIG. 1.

FIG. 4 shows the effect of different types of alkyl polyglycosides, APG ® 225, 425, and 625 on the viscosity of one type of $TiO_2$, TI-PURE ® R-960. FIG. 5 shows the effect of peaking of the alkyl polyglycoside wherein the monoglucosides have been removed and the higher molecular weight glucosides predominate in the product mixture on a specific type of $TiO_2$, TI-PURE ® R-960.

COMPARATIVE EXAMPLE 1

Dispersion of $TiO_2$ with Nonyl Phenol EO-10

A dispersion of TI-PURE ® R-960 in water was made by charging 100 grams of TI-PURE ® R-960, 37 grams of deionized water, 16 grams of Trycol ® 6974 surfactant (100% active), and 1 gram of Wacker AS-EM, SE-39, a silicon emulsion supplied by Wacker Chemical, Adrain, Mich., 49221, to a vessel and mixing for 30 minutes with a high speed Cowles blade mixer. The dispersion was allowed to cool under low shear agitation. The viscosity was too high to measure at Trycol ® 6974/TI-PURE ® R-960 ratios of 16 and 20.

COMPARATIVE EXAMPLE 2

Dispersion of $TiO_2$ with Nonyl Phenol EO-30

A dispersion of TI-PURE ® R-960 in water was made by charging 100 grams of TI-PURE ® R-960, 36 grams of deionized water, 23 grams of Trycol ® 6969 surfactant (70% active) to a vessel and mixing for 30 minutes with a high speed Cowles blade mixer. The dispersion was allowed to cool under low shear agitation. The viscosity was too high to measure at Trycol ® 6974/TI-PURE ® R-960 ratios of 16 and 20.

What is claimed is:

1. A composition comprised of titanium dioxide, water and one or more compounds of the formula I $$R_4O(R_5O)_a(Z)_b \qquad I$$

Wherein $R_4$ is a monovalent organic radical having from about 6 to about 30 carbon atoms; $R_5$ is divalent alkylene radical having from 2 to 4 carbon atoms; Z is saccharide residue having 5 or 6 carbon atoms; a is a number having a value from 0 to about 12; b is a number having a value from 1 to about 6.

2. The composition of claim 1 wherein said compound of formula I is an alkylpolyglycoside in which the alkyl group contains 8 to 10 carbon atoms.

3. The composition of claim 1 wherein said compound of formula I an alkyl polyglycoside in which the alkyl group contains 8 to 16 carbon atoms.

4. The composition of claim 1 wherein said compound of formula I is an alkyl polyglycoside in which the alkyl groups contains 12 to 16 carbon atoms.

5. The composition comprised of 75% by weight of $TiO_2$ and 25% by weight of a mixture comprised of water and a compound of the formula I $$R_4O(R_5O)_a(Z)_b \qquad I$$

Wherein $R_4$ is a monovalent organic radical having from about 6 to about 30 carbon atoms; $R_5$ is divalent alkylene radical having from 2 to 4 carbon atoms; Z is saccharide residue having 5 or 6 carbon atoms; a is a number having a value from 0 to about 12; b is a number having a value from 1 to about 6.

6. A method of dispersing titanium dioxide in water which comprises adding to a mixture comprised of water and titanium dioxide a dispersing amount of a compound of the formula I $$R_4O(R_5O)_a(Z)_b \qquad I$$

wherein $R_4$ is a monovalent organic radical having from about 6 to about 30 carbon atoms; $R_5$ is divalent alkylene radical having from 2 to 4 carbon atoms; Z is saccharide residue having 5 or 6 carbon atoms; a is a number having a value from 0 to about 12; b is a number having a value from 1 to about 6.

7. The process of claim 6 wherein said compound of formula I is an alkylpolyglycoside in which the alkyl group contains 8 to 10 carbon atoms.

8. The process of claim 6 wherein said compound of formula I is an alkyl polyglycoside in which the alkyl group contains 8 to 16 carbon atoms.

9. The process of claim 6 wherein said compound of formula I is an alkyl polyglycoside in which the alkyl groups contains 12 to 16 carbon atoms.

10. The composition of claim 1 wherein said compound of formula I is a peaked alkyl polyglycoside.

11. The process of claim 6 wherein said compound of formula I is a peaked alkyl polyglycoside.

* * * * *